Nov. 2, 1926.

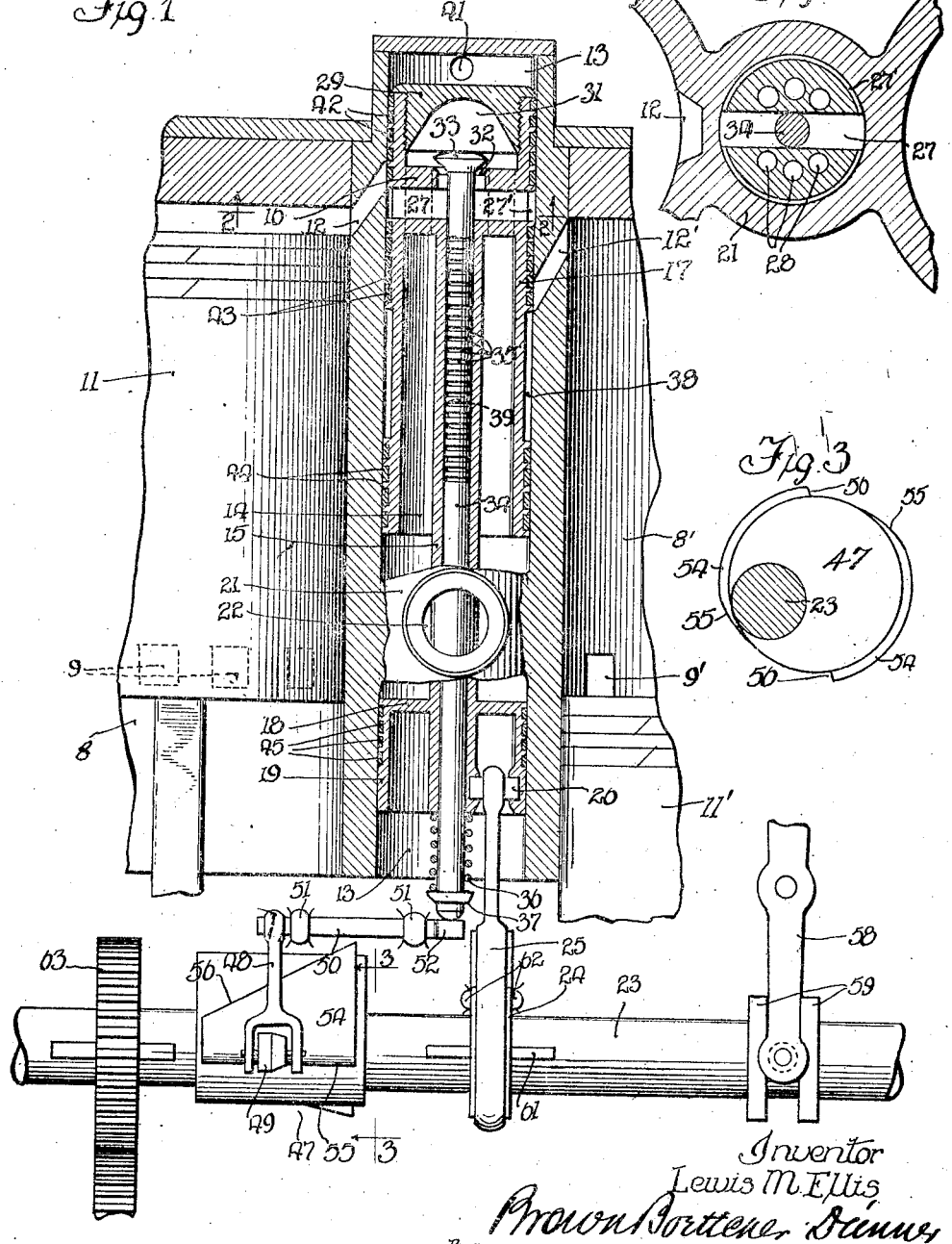

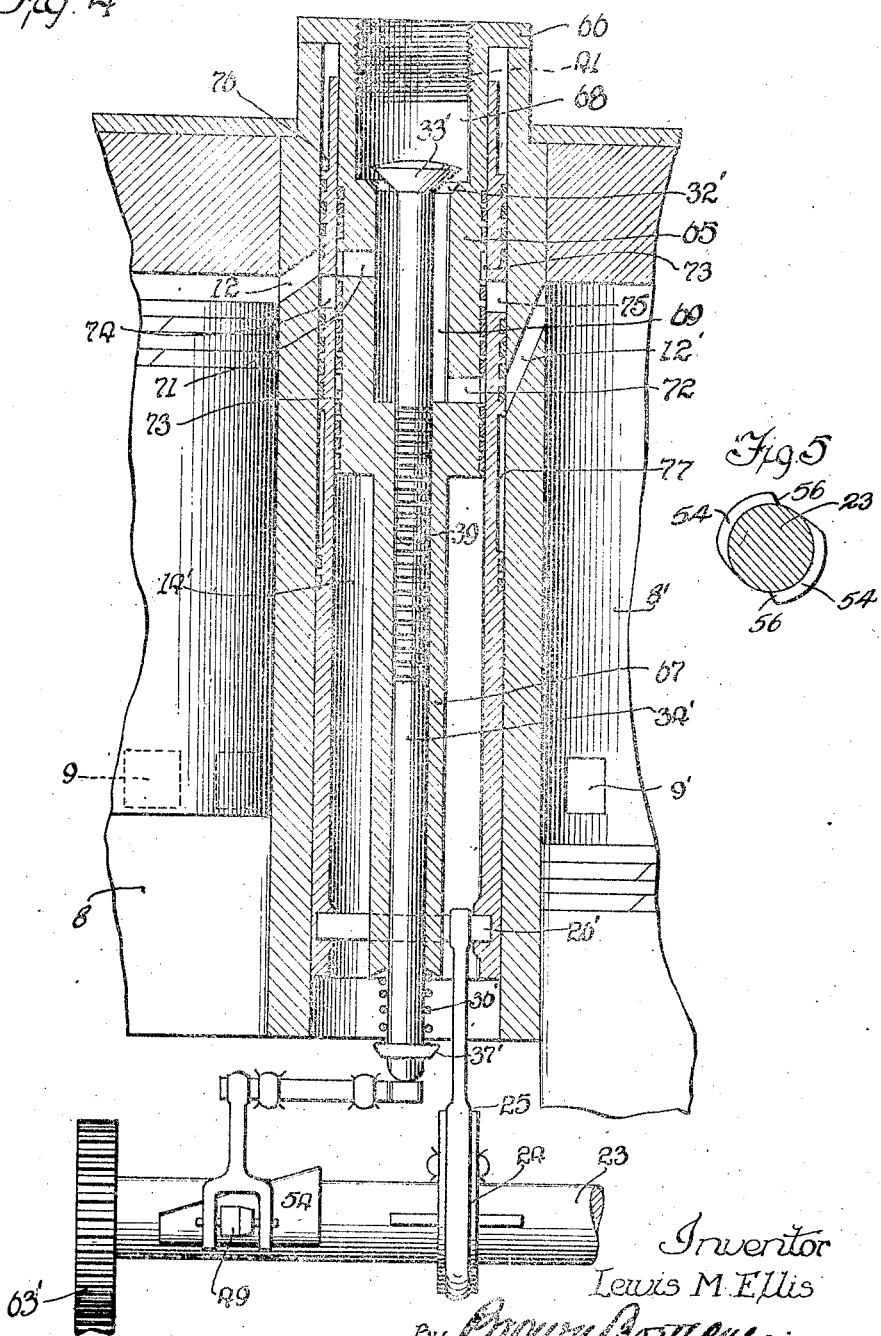

L. M. ELLIS 1,605,657

VALVE FOR STEAM ENGINES

Filed June 16, 1921   5 Sheets-Sheet 3

① L.H. PISTON POWER STROKE
② R.H. PISTON POWER STROKE
③ SLEEVE ADMISSION L.H.
③ COMPRESSION RELIEF R.H.
④ SLEEVE ADMISSION R.H.
④ COMPRESSION RELIEF L.H.
⑤ POPPET ADMISSION L.H. } VARIABLE CUT-OFF
⑥ POPPET ADMISSION R.H. }   1% TO 50%

Inventor
Lewis M. Ellis

By Brown Boettcher
   Dienner   attys

Nov. 2, 1926.

L. M. ELLIS 1,605,657

VALVE FOR STEAM ENGINES

Filed June 16, 1921   5 Sheets-Sheet 4

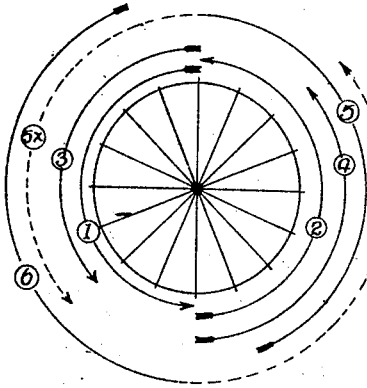

1. POWER STROKE L.H. PISTON
2. POWER STROKE R.H. PISTON
3. SLEEVE OPEN TO L.H. PISTON
4. SLEEVE OPEN TO R.H. PISTON
5. POPPET OPEN TO L.H. PISTON 0% CUT OFF, SOLID LINE
5X. POPPET OPEN TO L.H. PISTON 0% TO 75% CUT OFF, DOTTED LINE
6. POPPET OPEN TO R.H. PISTON 0% CUT OFF, SOLID LINE
6X. POPPET OPEN TO R.H. PISTON 0% TO 75% CUT OFF, DOTTED LINE

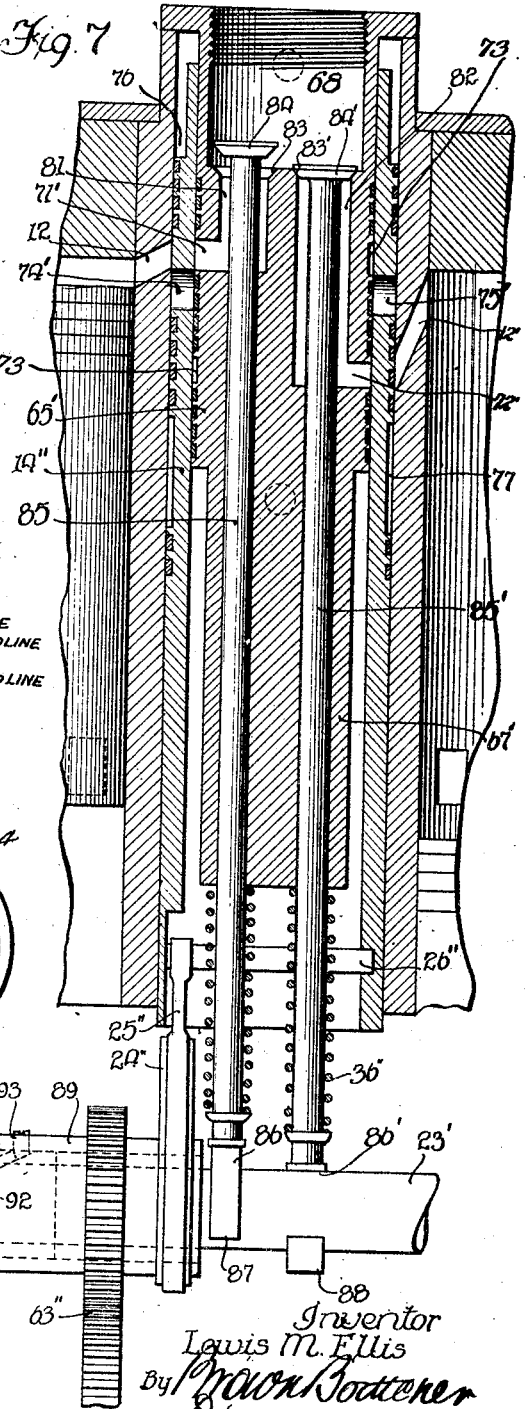

Inventor
Lewis M. Ellis
By Brown Boettcher
Dienner  Att'ys

Nov. 2, 1926.　　　　　　　　　　　　　　　　1,605,657
L. M. ELLIS
VALVE FOR STEAM ENGINES
Filed June 16, 1921　　　　5 Sheets-Sheet 5
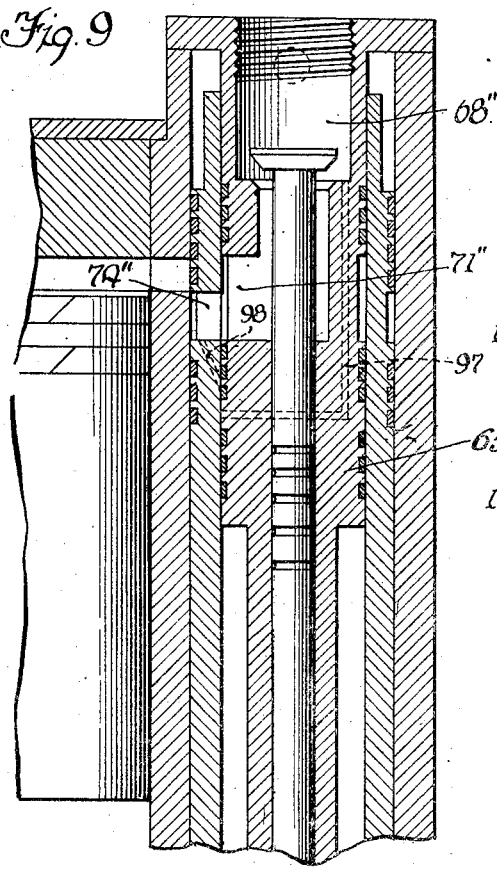
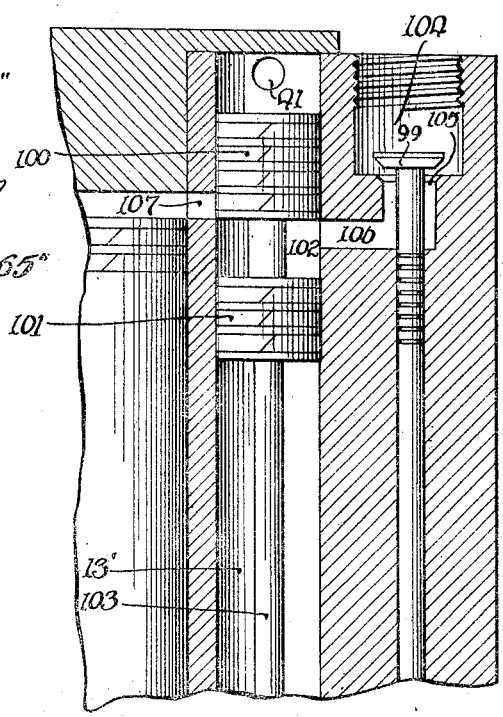
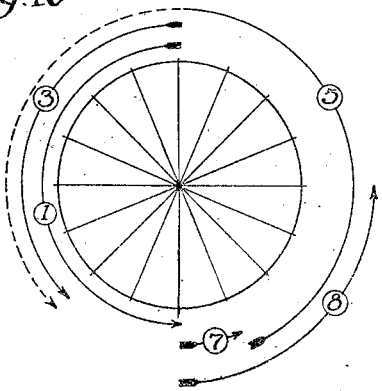
1 POWER STROKE OF PISTON
3 SLEEVE OPEN
5 POPPET OPEN
7 PRE-ADMISSION TO BALANSE POPPET
8 COMPRESSION RELIEF OPEN
Inventor
Lewis M. Ellis
by
Att'ys Patented Nov. 2, 1926.

1,605,657

UNITED STATES PATENT OFFICE.

LEWIS M. ELLIS, OF EVANSTON, ILLINOIS; GEORGE M. ELLIS, ADMINISTRATOR, ASSIGNOR TO WINSLOW SAFETY HIGH PRESSURE BOILER COMPANY, OF CHICAGO, ILLINOIS, A CORPORATION OF ILLINOIS.

VALVE FOR STEAM ENGINES.

Application filed June 16, 1921. Serial No. 477,901.

The present invention relates to valves for steam engines, and has as its fundamental object the provision of valve mechanism which will be capable of a wide range of cut-off variation and which will permit of an exceedingly short cut-off, of five per cent or even of less degree. A further object is to provide valve mechanism which will sustain high pressures without leakage, and which will handle these pressures at all degrees of cut-off without wire drawing or cutting of the valve mechanism. A further object is to provide valve mechanism which can operate to give a compression relief step in the cycle, this being of particular utility in the unaflow type of engine.

With the more extensive use of high pressure steam for power purposes (ranging as high as 500 or 600 pounds), the deficiencies of the conventional forms of valves heretofore employed have become more manifest and of greater significance in the design of high pressure valve gear. For example, the D type of valve is naturally unbalanced, which is of considerable disadvantage under high pressure, as its bearing surfaces are difficult to lubricate, particularly under high temperatures, and are subject to excessive and uneven wear. Furthermore, the D type of valve is exceedingly inadaptable to change of cut-off for the reason that its range is very limited and any variation of cut-off affects the exhaust or otherwise affects the valve cycle undesirably. With reference to the piston type of valve, the small bearing area of this valve is productive of rapid wear and leakage. The poppet type of valve is particularly capable of holding high pressures, but is not adapted to short cut-offs nor to an exact opening on the dead center point of the piston stroke. This follows from the mechanical difficulty of designing a cam which will open the valve to the proper extent and close it in the brief interval of a short cut-off. The pitch of the raising face of the cam cannot be increased beyond a certain point, which absolutely limits the sharpness of cut-off which it is possible to obtain (the minimum usually being in the neighborhood of 20 per cent). This relatively slow rise of the cam face, furthermore, prevents exact, full opening of the valve on the dead center point of the piston stroke, especially after the cams and other parts have become worn.

In the present invention I have overcome the disadvantages inherent in each of these previous types of valves by combining the poppet type of valve with a suitable reciprocating valve, such as of the sleeve or piston type. The resulting arrangement is a series or two-stage construction possessing the combined advantages of both types of valves, the sleeve or piston valve affording a fixed inlet which opens quickly and at the dead center point of the piston stroke, and the poppet valve affording a sharp cut-off which may be adjusted for a wide range of steam admission. For una-flow engines the sleeve valve portion may be advantageously designed to provide a compression relief function. The sleeve mechanism is balanced in all positions, so that minimum power is required for its operation, and minimum wear results from use.

Referring to the accompanying drawings wherein a preferred embodiment of my invention is shown:

Figure 1 is a fragmentary sectional view, partly in diagram, of one form of my invention;

Figure 2 is a sectional view through the valve mechanism taken on the plane of the line 2—2 of Figure 1;

Figure 3 is a sectional view taken on the plane of the line 3—3 of Figure 1;

Figure 4 is a view similar to Figure 1, showing another form of my improved valve mechanism;

Figure 5 is a sectional view through the cam shaft;

Figure 7 is a sectional view of another embodiment of my invention;

Figure 8 is a valve event diagram illustrating the cycle of this modification;

Figure 9 is a fragmentary sectional view of one of the previous embodiments provided with preadmission passages for balancing the poppet valve;

Figure 10 is a valve event diagram of the above;

Figure 11 is a fragmentary sectional view of a modified construction embodying a piston and a poppet valve, and Figure 12 is a detailed view looking in the direction of the axis of the shaft and showing a tappet arm or lever extending at right angles to its shaft.

Figure 6:
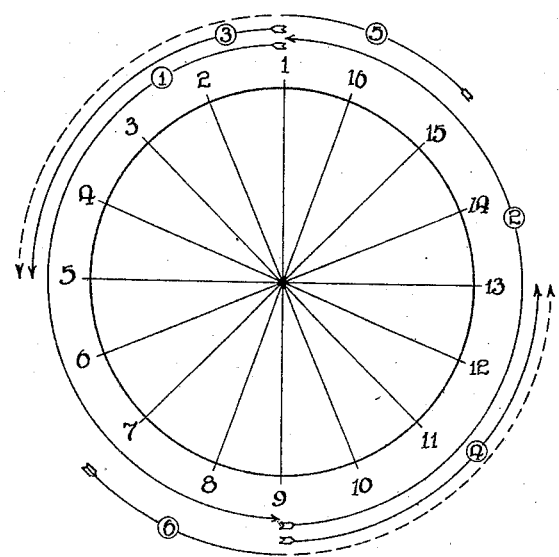
Figure 6 is a valve event diagram illustrating the cycle of the valve mechanism.

For the purposes of illustration, I have shown the valve mechanism embodied between the two cylinders of a two cylinder single-acting una-flow engine. The una-flow cylinders 8—8' have exhaust ports 9—9' which are adapted to be overrun by the pistons 11—11' at the lower ends of the power strokes. Admission into these cylinders occurs through diagonal admission ports 12—12' which open into a cylindrical valve chamber 13 disposed in the median plane between the two engine cylinders 8—8'. Reciprocating in this valve chamber is a cylindrical sleeve or piston valve designated 14 in its entirety. This sleeve valve comprises a central tubular stem 15 on the upper end of which is formed a head portion 16 formed with a relatively long outer sleeve 17. The lower end of the stem 15 supports a head 18 from which depends a short outer sleeve 19. As shown in Figure 2 the valve chamber 13 is completed by semi-circular walls 21 in one of which is provided the steam inlet 22, entering the valve chamber 13 at a point between the lower end of the sleeve 17 and the head 18. The sleeve valve 14 is adapted to be reciprocated either by a cam or eccentric mounted on the engine cam shaft 23. In the arrangement shown, an eccentric 24 connects through an eccentric link 25 with a wrist pin 26 in the lower end of the sleeve valve for reciprocating the same. The head portion 16 of the sleeve valve is provided with a transverse bore 27, which is adapted to register with the inlet passages 12—12' when the pistons in the respective cylinders 8—8' are at the tops of their strokes. This head portion is bored to provide a plurality of steam passages 28 extending up through the head portion around the transverse passage 27. The upper end of the sleeve 17 is threaded internally for the reception of a plug 29 which defines a small steam chamber 31 above the head portion 16. A valve port 32 opens from this chamber downwardly into the transverse bore 27. This valve port is controlled by a poppet valve 33, the stem 34 of which passes downwardly through the steam passage 27 and the bore of the tubular stem 15. The stem 34 may be packed in any suitable manner, such as by a labyrinth packing consisting of a multiplicity of grooves 35 formed in the stem 34. The poppet valve is normally held seated in the sleeve valve 14 so as to move with the latter in its travel by a compression spring 36 which is confined between the end of the tubular stem 14 and a collar 37 secured to the end of the valve stem 34.

Intermediate the transverse steam passage 27 and the bottom of the sleeve 17 an annular groove 38 is formed in the outer circumference of said sleeve. This groove communicates with an exhause port 39 opening out through the side wall 21 of the valve housing. This annular groove is adapted to register with the inlet passage 12' during the first part of the up stroke of the piston 11' for relieving compression in the cylinder 8', as will hereinafter appear. The top of the valve chamber 13 is closed, and leading from the upper end thereof is a second exhaust opening 41 for discharging steam exhausted into the upper end of the valve chamber during the compression relief period of the lefthand cylinder 8, when the upper end of the sleeve 17 has overrun the inlet passage 12. A noteworthy characteristic of the sleeve valve is the tightness of joint which may be secured by the efficient use of piston rings, and this security against leakage is further augmented by the ground joint between the poppet valve 33 and its seat 32. It will be noted that the transverse steam passage 27 is so disposed in the sleeve valve that a plurality of piston rings 42 and 43 can be disposed in the outer surface of the valve above and below this steam passage so that there is a minimum possibility of steam leakage either way therefrom. An annular groove 27' is formed in the circumference of the valve co-incident with the transverse steam passage 27 to distribute the steam from said passage around all sides of the valve to retain a balance of pressures on the valve. The lower end of the sleeve 17 is provided with a plurality of rings 44 for preventing the leakage of live steam into the compression relief groove 38, and the lower sleeve 19 is formed with a plurality of rings 45 for preventing leakage down past the lower end of the valve.

The poppet valve 33 is controlled by an eccentric cam 47 on the cam shaft 23. This eccentric cam operates through an oscillating tappet arm 48 supporting a roller 49 which bears on the cam 47. The tappet arm 48 is mounted on a rock shaft 50 supported in fixed bearings 51, the opposite end of this rock shaft 50 having a forwardly extending arm 52 which operates as a tappet to engage and actuate the valve stem 34, said arm 52 as illustrated in the drawings and particularly Fig. 12 looking in the direction of the axis of shaft 23 in Fig. 1, constituting a lever extending at right angles from shaft 50. As shown in Figure 3, the eccentirc cam 47 comprises an eccentric on which are formed two tapering cams 54—54 of identical form and located at diametrically opposite points on the eccentric. As a result of the present series or two-stage arrangement of the sleeve and poppet valves I am enabled to design the leading edges 55 of these cams with a gradual rise such as is desirable for the quiet and efficient operation of the valve mechanism, without thereby effecting the length of cut-off or the accuracy of opening of the valve mechanism. As shown in the event diagram of Figure 6, by the present construction, I am enabled to devote 45 degrees or more of the cam shaft rotation to the raising edge of each cam, this raising portion of each cam corresponding to the solid portions of the arrows 5 and 6. The trailing edges 56 of these cams may be made gradual or quite abrupt, as desired. Each trailing edge is inclined relative to the axis of the eccentric as shown, and both cams are designed so that any desired cut-off can be obtained by shifting the cams to bring different points of the trailing edges 56 into line with the tappet roller 49. The eccentric 47 is displaced angularly from the eccentric 24 to accommodate the lateral point of engagement of the tappet roller 49, the eccentric 47 and tappet arms 48 and 52 being designed to produce a motion of the tappet arm 52 concurrently with the rise and fall of the sleeve valve 14. Adjustment of cut-off is effected by shifting the cam shaft 23 through the instrumentality of a shifting lever 58 engaging between collars 59 on the shaft. The eccentric 24 is driven through a longitudinal key 61 projecting from the shaft 23, this eccentric being held against lateral motion during shifting of the cam shaft by stationary lugs 62 projecting from the frame of the engine and embracing the eccentric. This cam shaft is preferably splined to the timing gear 63, although for a reversing embodiment of the valve gear, I contemplate employing a shiftable collar between the gear and shaft for rotating one through a predetermined angle relative to the other for reversing the cycle. The manner of effecting such reversal will be obvious to one skilled in the art, and accordingly I have not illustrated the same.

The admission cycle for each cylinder is substantially the same, and accordingly reference will only be made to the cycle of the left hand cylinder 8. Assuming that the eccentric 24 is in its lower dead center position, it will be apparent that the upward throw of the eccentric will raise the sleeve valve 14 and poppet valve 33 as a unit, with the tappet arm 52 closely following the valve stem 34 in slightly spaced relation thereto. When the eccentric 24 has approached to within approximately 45 degrees of the inlet position of the sleeve valve, one of the cams 54 becomes effective by rocking the tappet arm 52 for accelerating the movement of and raising the poppet valve 33 during the continued upward movement of the sleeve and poppet valves. The poppet valve has the remaining 45 degrees to the admission event in which to complete its opening movement, the opening of the valve during this interval admitting steam from the chamber 31 down into the transverse steam passage 27, in readiness for admission to the cylinder. At the upper limit of the throw of the eccentric 24 the transverse steam passage 27 moves into register with the inlet passage 12 at a time when the piston 11 is substantially in its upper dead center position. The resulting admission of steam occurs from the flow of steam up through the passages 28, down through the valve port 32, and through the steam passage 27 into the inlet passage 12. At this time the eccentric 24 has moved to its upper dead center area and consequently, the transverse steam passage 27 remains in communication with the inlet 12 during a relatively long portion of the downstroke of the piston. During this period, cut-off occurs by the tappet roller 49 riding off the trailing edge 56 of the cam 54 and allowing the poppet valve 33 to seat and close off further admission of steam, the point of cut-off being, of course, controlled by the axial positions of the cams 54 relative to the tappet roller 49. In the event diagram, the dotted portions of the arrows 5 and 6 indicate the range of cut-off which is possible to obtain. The downward throw of the eccentric 24 moves the steam passage 27 out of communication with the steam inlet 12 at approximately the middle of the downstroke of the piston, the sleeve admission interval being represented by the arrows 3 and 4 on the event diagram. When the piston 11 reaches the bottom of its stroke it overruns the terminal ports 9 and permits exhaust therethrough, as in conventional una-flow practice. At this time the eccentric 24 is also at the bottom of its throw, the crank shaft and cam shaft being geared for the same speed of rotation, and in this position of the eccentric the upper end of the sleeve 17 is sufficiently far down to expose the inlet passage 12 and vent such passage into the upper end of the valve chamber 13. During the following upstroke of the piston 11 this inlet passage 12 remains uncovered through a part of the return stroke, as represented by the arrows 3 and 4 of the event diagram, thereby exhausting steam out through the passage 41 and preventing the creation of excessive compression pressures. The subsequent upward movement of the sleeve valve 14 repeats the cycle above described. The cycle for the righthand cylinder 8' is identical with the exception that compression relief occurs into the annular groove 38 which exhausts through the steam passage 39. It will be apparent from the foregoing that the sleeve valve 14 affords a fixed inlet which always opens near the top of the piston stroke, depending upon the desired lead, and also affords an effective compression relief; while the poppet valve associated therewith affords a variable cut-off adjustable from an extremely short admission or complete shut-off to any maximum admission desired.

In the modified construction illustrated in Figure 4 the poppet valve 33′ operates in the stationary sleeve 65 which is arranged concentrically within the reciprocating valve sleeve 14′. In this embodiment the sleeve 14′ is continuous from end to end, and has the usual connection with the eccentric 24 through the link 25 and wrist pin 26′. The upper end of the inner stationary sleeve 65 is provided with a flange 66 which closes the top of the valve housing and which is rigidly secured thereto in any suitable manner. The lower end of this sleeve is formed with a depending stem 67 which is bored for guiding the stem 34′ of the poppet valve 33′. Steam is admitted into a chamber 68 in the upper end of the stationary sleeve 65, this sleeve being threaded internally or otherwise arranged for the reception of the steam admission pipe. The chamber 68 communicates through the poppet valve opening 32′ with a second chamber 69 which conducts the steam to upper and lower radial steam passages 71 and 72. Each steam passage 71—72 is substantially aligned with the corresponding inlet passage 12—12′, and each of these radial passages has a balancing groove 73 extending around the circumference of the sleeve for balancing the steam pressures thereon. Communication between the radial steam passages 71 and 72 and the corresponding inlet passages 12 and 12′ is adapted to be completed by ports 74 and 75 which move into register with the steam passages during the admission event of each cylinder 8—8′. The upper end of the moving sleeve 14′ is reduced as indicated at 76 to provide for a compression relief when this part of the sleeve comes into register with the inlet passage 12. The upper end of the valve chamber is vented at 41 for discharging this compression relief steam, as previously described. Compression in the other cylinder is relieved by an annular groove 77 in the outer moving sleeve which is adapted to communicate with the inlet passage 12′ and vent steam out through an opening 39 as above described. The outer sleeve 14′ is protected against leakage by the provision of rings above and below the ports 74 and 75, and the inner sleeve 65 is similarly protected by groups of rings 78 above, between and below the radial steam passages 71 and 72.

In this embodiment the cams 54 rotate concentrically with the cam shaft 23, as there is no reciprocating motion of the poppet valve concurrently with the sleeve valve in this construction. As before described, the opening of the poppet valve 33′ occurs considerably in advance of the actual admission event, the steam filling the chamber 69 and radial passages 71 and 72 preparatory to admission. At the top of the piston stroke the outwardly moving sleeve 14′ carries the ports 74 into communication with the passages 71 and 12 and admits steam into the cylinder 8. The port 74 remains in communication with the passages through a considerable portion of the down stroke of the piston, during which time cut-off may occur at any point by the tappet roller 49 riding off the trailing edge of the cam 54. At the bottom of the piston stroke, the reduced portion 76 of the outer sleeve moves below the inlet passage 12, thereby permitting the discharge of the residue of exhaust steam up into the upper end of the valve chamber during a predetermined part of the return stroke of the piston. The steam thus exhausted in the upper end of the valve chamber and out through the port 41 thus relieves against excessive compression. The cycle of the right hand cylinder 8′ is identical with the above.

Where an extremely wide range cut-off is desired, as from 0 per cent to 75 or 80 per cent, it is necessary or desirable that the cut-off for each engine cylinder be controlled by an independent poppet valve, otherwise there will be the possibility of interference or overlapping of the valve events between the two cylinders. This multiple poppet valve construction is illustrated in Figure 7, wherein, for simplicity of illustration, the multiple poppet valve construction is shown embodied in the two sleeve construction of valve illustrated in Figure 4; it being understood, however, that this multiple poppet valve construction is also capable of embodiment in the single sleeve type of valve illustrated in Figure 1. The outer reciprocating sleeve 14″ is substantially similar to the sleeve 14′ of the previous embodiment, having the opposite steam admission ports 74′ and 75′ adapted to register between the aligned steam passages and ports 12—12′ and 71′ and 72′. The inner stationary sleeve 65′ is provided with individual steam passages or chambers 81 and 82 which are adapted to establish individual communication between their respective steam ports 71′ and 72′ and the common steam chamber 68. The upper ends of both steam passages 81 and 82 are formed with tapering valve seats 83—83′ for the reception of the poppet valves 84—84′. The valve stems 85—85′ extend down through bores in the depending stem portion 67′ of the inner sleeve, and carry valve tappets 86—86′ for cooperation with cams 87 and 88 on the cam shaft 23′. The usual compression springs 36″ tend to seat the valves 84—84′.

The outer sleeve 14″ is reciprocated through the previous arrangement of wrist pin 26″, eccentric link 25″ and eccentric 24″, the eccentric in this instance, however, being mounted upon a sleeve 89 which is separate from the cam shaft 23′ for the purpose of providing the cut-off adjustment. To this end the timing gear 63″ is mounted directly upon the sleeve 89 and provision is made for relative angular adjustment between the sleeve 89 and the cam shaft 23′ by a shiftable sleeve 90 which is interposed between the sleeve 89 and the shaft 23′. This intermediate sleeve 90 has a pin and slot connection 91 with the cam shaft 23′ to permit longitudinal motion therealong, and has a helical or diagonal slot 92 of the proper angular extent to give the desired cut-off variation. A pin 93 is projected through the outer sleeve 89 to engage in the the diagonal slot or groove 92 so as to produce a rotative movement of the intermediate sleeve 90 and cam shaft 23′ upon the longitudinal shifting of the intermediate sleeve. This longitudinal shifting is effected by any suitable shifting fork 94 engaging in a groove 95 in the end of the sleeve. It will be apparent that the angular deviation effected between the timing gear 63″ and the cam shaft 23′ by the shifting of the intermediate sleeve 90 will effect the advancing or retarding of the two cams 87 and 88 relative to the eccentric 24″.

In the cycle of the foregoing construction the outer sleeve 14″ is reciprocated to control the admission and compression relief event in the identical manner previously described. Each cam 87—88 holds its respective poppet valve open through a definite angular extent in the cycle, which must be sufficiently large to provide for the maximum degree of cut-off and still insure that the poppet valve will be fully opened before the admission event. As shown in the event diagram, I propose designing these cams for a valve opening interval of approximately 157½ degrees, although this may be widely departed from for any particular design. The period of open position of each poppet valve may be angularly shifted relative to the corresponding inlet event of the sleeve valve, so that the fraction of open position interval of the poppet valve occurring subsequent to the inlet event of the sleeve valve can be increased or reduced. For example, in the timing relation illustrated in the diagram, wherein the solid portions of the arcs 5 and 6 illustrate the intervals of open position of each poppet valve, it will be observed that by rotating the cams 86—86′ relative to the cam shaft the open positions of these poppet valves may be placed to a greater or less extent in registry with the open positions of the sleeve valve. In the relation illustrated the cut-off would be 0 per cent. By rotating the cams to correspond to the timing relation indicated by the dotted arcs $5^x$ and $6^x$ the cut-off would be increased to 75 per cent. This means that 135 degrees of the open position of the poppet valve would occur subsequent to the sleeve inlet event and the remainder of the open position of the poppet valve would occur prior to the inlet event, thereby giving the required lead to insure full opening of the poppet valve before admission. It will thus be seen that by adjusting the cam shaft, the 157 degrees of opening of each poppet valve can be rotated to place any desired portion thereof in register with the admission event of the sleeve, these variable portions of cut-off being represented by the full line and the dotted arcs 5—$5^x$ and 6—$6^x$. The maximum cut-off obtainable is indicated as being 75 per cent of the piston stroke, but it will be apparent that this cut-off can be still further increased by appropriately timing and constructing the sleeve valve to provide a longer admission event.

In each of the three constructions just described, the valve gear is capable of reducing the cut-off to an infinitely small percentage, or of interrupting the flow of steam to the engine entirely, whereby this valve gear can be utilized to perform the shut-off or speed varying functions for fine gradations of speed, which are usually performed by a throttle valve.

To the end of minimizing the effort required to raise the poppet valve against boiler pressure I contemplate effecting a preadmission of steam below the poppet valve to partially or entirely balance the same. This may be found desirable owing to the fact that the poppet valve has not the balancing influence of the compression pressure from the cylinder to assist its opening. The feature is illustrated in Figure 9, the construction shown therein being very similar to Figures 4 and 7. The inner stationary sleeve 65″ is provided with a vertical steam passage 97 which extends down from the live steam chamber 68″ and then horizontally to the wall of the inner sleeve below the steam passage 71″. A second preadmission passage 98 is drilled in the outer reciprocating sleeve from the port 74″ diagonally down to the inner wall of this sleeve for registration with the first preadmission passage 97. In this construction the steam passage 71″ is cut downwardly below the level shown in the previous constructions to effect registration with the port 74″ at an earlier point in the cycle. The preadmission passages 97 and 98 are timed to register just a short time prior to the point of earliest possible opening of the poppet valve, to thereby admit boiler pressure steam below the poppet valve through the port 74″ and passageway 71″ which are in register at this time. This preadmission event occurs at substantially the period indicated in the diagram of Figure 10; it being noted that the steam so preadmitted has no access to the engine cylinder but is confined within the steam passageway 71" below the poppet valve. This confined body of steam is always available for balancing the opening of the poppet valve irrespective of the time of raising of the poppet valve.

In Figure 11 the poppet valve 99 is associated with a piston valve consisting of balancing pistons 100—101 having an intervening steam space 102. The piston valve reciprocates in a cylindrical valve chamber 13' as before under the action of an eccentric on the timing shaft (not shown) operating through the stem 103. The poppet valve 99 is displaced laterally from the piston valve and operates in the live steam chamber 104. The valve port 105 communicates through passageway 106 with the valve chamber 13', and an admission port 107 enters this valve chamber from the engine cylinder at a higher level than the passageway 106. The arrangement of the cam and eccentric on the timing shaft is not shown as such will be evident from the previous forms. The timing corresponds to these previous embodiments, the poppet valve opening prior to the admission event and admitting steam into the intermediate area 102, and the piston 100 thereafter uncovering the admission port 107 and effecting the admission event. The cut-off occurs by the seating of the poppet valve and compression relief occurs by the upper piston 100 overrunning the admission port 107 and venting steam out through the opening 41.

The foregoing constructions have been chosen primarily for illustrative purposes, and it will be apparent that they may be widely departed from within the spirit and scope of the present invention.

I claim:

1. In combination, a steam engine cylinder having an admission port, a sleeve valve controlling said port, said sleeve valve comprising spaced heads, means for admitting live steam between said heads, a steam passage opening laterally from said sleeve valve and adapted to register with said admission port, a valve port in said sleeve connecting said steam passage with the live steam area between said heads, a poppet valve controlling said valve port, a hollow stem extending between said heads, the stem of said poppet valve extending out through said hollow stem, and means for reciprocating said sleeve valve, and a valve tappet adapted to receive the end of said valve stem for unseating said poppet valve.

2. In combination, a steam engine cylinder having an admission port, a sleeve valve controlling said port, a poppet valve carried by said sleeve valve and controlling the flow of steam therethrough, and eccentric for reciprocating said sleeve valve, and a cam for operating said poppet valve, said cam being eccentrically mounted to follow said poppet valve through the reciprocations of said sleeve valve.

3. In combination, a steam engine cylinder having an admission port, a sleeve valve controlling said port, a steam passage in said sleeve valve adapted to register with said port during a predetermined part of the piston stroke, a poppet valve controlling the admission of steam to said steam passage, an eccentric for reciprocating said sleeve valve, a cam for raising said poppet valve, and means for adjusting said eccentric and said cam relative to each other for placing a greater or less extent of the opening interval of said poppet valve in registry with the steam admitting interval of said steam passage.

4. In combination, a steam engine cylinder having an admission port, a sleeve valve controlling said port and affording a definite inlet event, a poppet valve in series with said sleeve valve for controlling the admission of steam to said cylinder, a cam controlling said poppet valve and producing a definite interval of open position of said poppet valve, and adjustable co-operating means with said cam for regulating the proportion of said interval occurring prior and subsequent to the inlet event controlled by said sleeve valve.

5. In combination, a steam engine cylinder having an admission port, a sleeve valve controlling said admission port, means for moving the said sleeve valve to uncover said admission port for admitting steam thereto and to the cylinder, a passage adapted to admit steam to said sleeve valve, and a poppet valve controlling said steam passage, said poppet valve moving with the sleeve valve and opening before said sleeve valve during the admission stroke and closing before the sleeve valve during the working stroke to cut off the steam.

6. In combination, a steam engine cylinder having an admission port, a sleeve valve controlling said port, means for reciprocating said sleeve valve, a steam passage to said sleeve valve for conducting the steam to said sleeve valve admission port and cylinder, a steam inlet, a valve port between said steam inlet and said steam passage, a poppet valve moving with the sleeve valve and controlling said valve port, and adjustable cam means for controlling said poppet valve to regulate the cut-off.

7. In a valve mechanism for expansion engines including a piston, a first valve, a second valve co-operating with said first valve, means to impart a definite throw to the first valve, and means to actuate said second valve, said means adapted to permit the second valve to travel with and remain seated on the first valve during part of each reciprocation of the latter and to cause the said second valve to open and close during the admission part of the stroke of the first valve and working stroke of the piston.

8. In a valve mechanism for expansion engines, a first valve, a second valve cooperating with said first valve, means to impart a definite throw to the first valve, and means to actuate said second valve, said means adapted to permit the second valve to travel with and remain seated on the first valve during part of each reciprocation of the latter and to cause the said second valve to close before and during the admission part of the stroke of the first valve.

9. In a valve mechanism for expansion engines, a first valve, a second valve cooperating with said first valve, means to actuate the first valve, means for actuating the second valve, and connections between said last-named means and said second valve which permit the latter to remain seated on the first valve during part of the movement of the latter and to unseat near the end of its movement when said means are traveling together in the same direction and said connections adapted to unseat the second valve when said means are traveling in the opposite direction.

10. In a valve mechanism, a first valve, a second valve abutting said first valve seated thereon, and means for moving both valves in the same direction and to advance the movement of the second valve to unseat the same in one direction and to advance the movement of the second valve to seat the same in the opposite direction.

11. In combination, a first valve construction, a second valve construction seated within said first valve construction, and means for moving both the constructions in the same direction and to advance the movement of the second valve construction to unseat the same in one direction and to advance the movement of the second valve construction to seat the same in the opposite direction.

12. In combination, an engine cylinder, a first valve associated therewith, a second valve associated with the first valve, and means for moving both valves in the same direction and to advance the movement of the second valve to unseat the same in one direction and to advance the movement of the second valve to seat the same in the opposite direction, the said valves controlling the admission of the fluid to the cylinder, and the said first valve at predetermined intervals affording compression relief to the said cylinder.

13. In combination, a first valve construction, a second valve construction seated within said first valve construction, a fluid inlet, means including a passage intermediate the two valve constructions for admitting fluid to the first construction, the said second construction when seated disconnecting the steam inlet from the passage, means for moving both the constructions in the same direction and to advance the movement of the second construction to unseat the same in one direction and to advance the movement of the said second construction to seat the same in the opposite direction, and means for admitting a relatively small quantity of fluid to the said passage to balance the unseating of the said second construction.

14. In combination, a steam engine cylinder having an admission port, a sleeve valve controlling said admission port, means for moving the said sleeve valve to uncover said admission port for admitting steam thereto and to the cylinder, a passage adapted to admit steam to said sleeve valve, a poppet valve controlling said steam passage, said poppet valve moving with the sleeve valve and opening before said sleeve valve during the admission stroke and closing before the sleeve valve during the working stroke to cut off the steam, and means for admitting steam to the said passage prior to the opening of the poppet valve associated therewith to balance the opening of the said poppet valve.

15. In combination, an engine including a piston, a sleeve valve associated therewith, a poppet valve associated and movable in the same direction as and with the said sleeve valve, means for reciprocating the sleeve valve, and means for actuating the said poppet valve, said latter means permitting the said poppet valve to travel with and remain seated during part of each reciprocation of the sleeve valve, and to cause the said poppet valve to open and close during the admission part of the movement of the said sleeve valve and the working stroke of the said piston.

In witness whereof, I hereunto subscribe my name this 9th day of June, 1921.

LEWIS M. ELLIS.

Certificate of Correction.

It is hereby certified that Letters Patent No. 1,605,657, granted November 2, 1926, upon the application of Lewis M. Ellis, of Evanston, Illinois, whose administrator is George M. Ellis, for an improvement in "Valves for Steam Engines," were erroneously issued to "Winslow Safety High Pressure Boiler Company," whereas said Letters Patent should have been issued to *Tubal Boiler Co., of Chicago, Illinois, a corporation of Illinois*, said corporation being assignee of the entire interest in said invention, as shown by the records of assignments in this office; and that the said Letters Patent should be read with this correction therein that the same may conform to the record of the case in the Patent Office.

Signed and sealed this 14th day of December, A. D. 1926.

[SEAL.]
M. J. MOORE,
*Acting Commissioner of Patents.*